(12) United States Patent
Gordon

(10) Patent No.: US 9,713,904 B2
(45) Date of Patent: Jul. 25, 2017

(54) DISCRETE 3D DEPOSITION PRINTER

(71) Applicant: Solid Fusion, LLC, Vienna, VA (US)

(72) Inventor: Mark Christopher Gordon, Vienna, VA (US)

(73) Assignee: Solid Fusion, LLC, Vienna, VA (US)

( * ) Notice: Subject to any disclaimer, the term of this patent is extended or adjusted under 35 U.S.C. 154(b) by 77 days.

(21) Appl. No.: 14/701,427

(22) Filed: Apr. 30, 2015

(65) Prior Publication Data

US 2015/0314529 A1    Nov. 5, 2015

Related U.S. Application Data

(60) Provisional application No. 61/986,864, filed on Apr. 30, 2014.

(51) Int. Cl.
*B29C 67/00* (2017.01)
*B29L 31/00* (2006.01)
*B33Y 10/00* (2015.01)
*B33Y 40/00* (2015.01)
*B33Y 30/00* (2015.01)

(52) U.S. Cl.
CPC ...... *B29C 67/0074* (2013.01); *B29C 67/0085* (2013.01); *B29C 67/0051* (2013.01); *B29C 67/0055* (2013.01); *B29L 2031/772* (2013.01); *B33Y 10/00* (2014.12); *B33Y 30/00* (2014.12); *B33Y 40/00* (2014.12)

(58) Field of Classification Search
CPC ............ B29C 67/0051; B29C 67/0055; B29C 67/0074; B29C 67/0085; B33Y 10/00; B33Y 30/00; B33Y 40/00
USPC ........................................................ 425/375
See application file for complete search history.

(56) References Cited

U.S. PATENT DOCUMENTS

2014/0291886 A1* 10/2014 Mark .................... B29C 47/004
264/163
2015/0266235 A1* 9/2015 Page .................... B22F 3/1055
264/245

* cited by examiner

*Primary Examiner* — Matthew Daniels
*Assistant Examiner* — Lawrence D Hohenbrink, Jr.
(74) *Attorney, Agent, or Firm* — Sterne, Kessler, Goldstein & Fox P.L.L.C.

(57) ABSTRACT

Embodiments of a solid free form printer and a discrete deposition head are disclosed. The solid free form printer may include one or more discrete deposition heads. A discrete deposition head includes a feeder configured to feed a target material in solid form to a deposition assembly. The deposition assembly is configured to create a deposition piece from the target material and dispense the deposition piece onto a portion of the printed object, wherein the deposition piece is in solid form within the deposition assembly. The discrete deposition head also includes a target heat source that heats the portion of the printed object where the target material is to be placed.

18 Claims, 6 Drawing Sheets

DISCRETE 3D DEPOSITION PRINTER

FIELD OF THE INVENTION

Embodiments of the present disclosure relate generally to the field of 3d printing.

BACKGROUND

Solid freeform printers (SFFPs) have recently become very popular because they promise the ability to create three-dimensional objects easily from computer generated models. Indeed, because of the ease of use of SFFPs, SFFPs are increasingly being marketed towards consumers for in-home use. However, current SFFPs suffer from a number of drawbacks. Although, there are different variants of SFFPs, one common type uses a technique referred to as fused deposition modeling. In fused deposition modeling, a target material is melted within the nozzle of the 3d printer, and dispensed in a stream of liquid layer-by-layer until the desired object is created. Because the target material is in a melted state within the nozzle, eventually due to build-up and other factors, the nozzles often become clogged with target material. Additionally, because the target material is deposited in layers, objects printed using fused deposition modeling often show visible layering and do not have desirable shear-strength.

Another common type of SFFP uses a process known as laser sintering, or heat sintering. In these types of SFFPs, a powder is deposited for each layer of the printed object, and cured layer-by-layer with a heat source or a laser until the printed object is complete. Similarly, another common type of SFFP uses a process known as stereolithography (SLA), which deposits a resin layer-by-layer that is curable via ultraviolet light.

SFFPs also commonly take a long time to print objects. One reason for this is because they have single heads that dispense the target material onto the printed object. Accordingly, such SFFPs are limited by how fast they can move the heads and dispense the material from the heads. One reason why SFFPs have single heads is because streams of molten material, powders, or resins are not controllable enough to have multiple heads dispensing material at once. Other SFFP technologies based on piezo and thermal inkjet technology allow uniform material strength and color printing but must dispense material in low viscosity liquid form. Color bleed is also a problem with liquids.

BRIEF DESCRIPTION OF THE DRAWINGS/FIGURES

Embodiments of the present disclosure are described with reference to the accompanying drawings. In the drawings, like reference numbers indicate identical or functionally similar elements. Additionally, the left most digit(s) of a reference number identifies the drawing in which the reference number first appears.

The accompanying figures, which are incorporated herein, form part of the specification and illustrate embodiments of borehole sensing systems and components thereof. Together with the description, the figures further to serve to explain the principles of and allow for the making and using of the embodiments described herein. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

Figure 1:
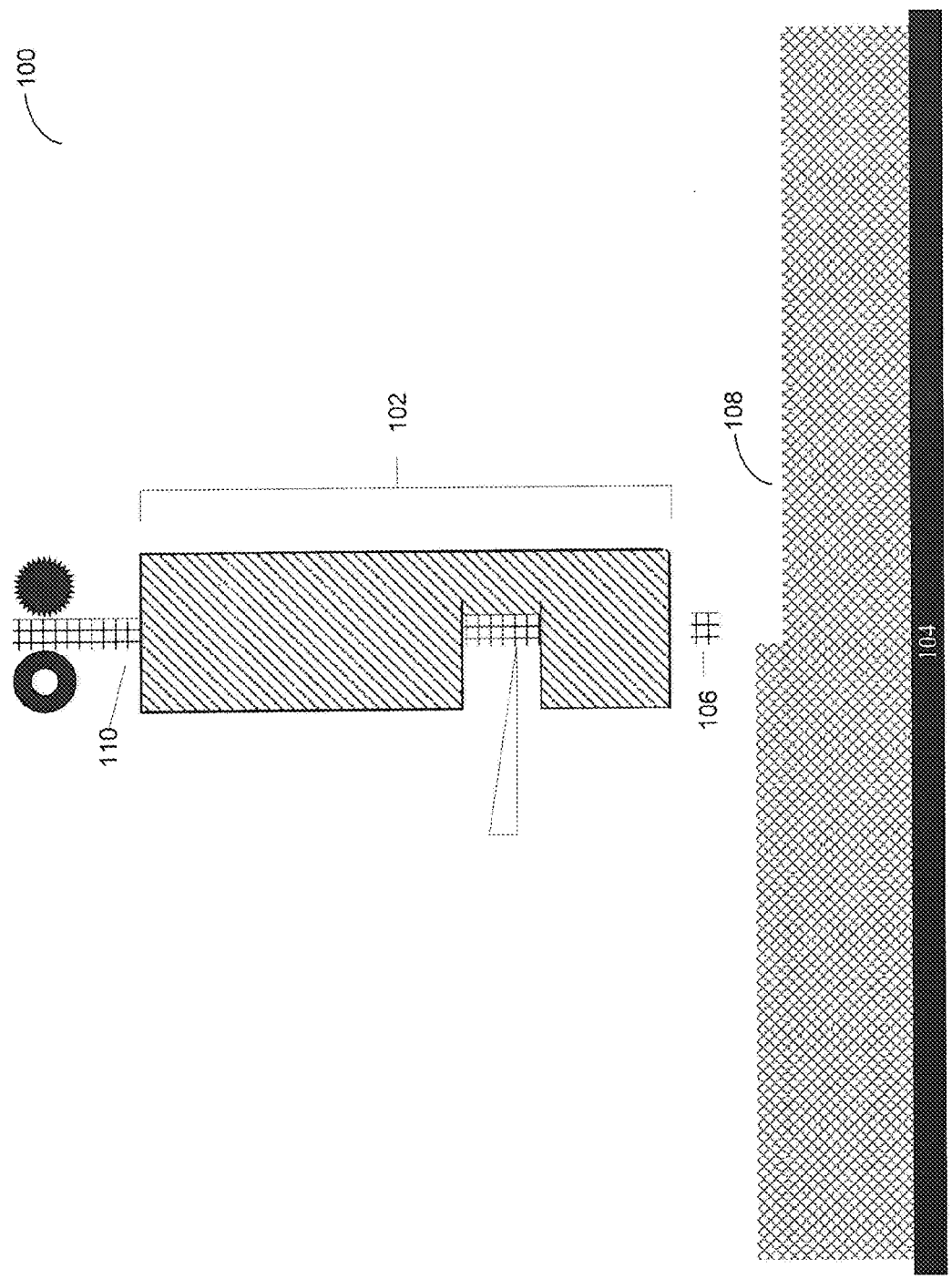
FIG. 1 is a diagram of a solid freeform (SFFP) printer having a discrete deposition head, according to an embodiment.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE INVENTION

The following Detailed Description refers to accompanying drawings to illustrate exemplary embodiments consistent with the present disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

The following Detailed Description of the exemplary embodiments will so fully reveal the general nature of the present disclosure that others can, by applying knowledge of those skilled in relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

An Example 3D Printer

FIG. 1 is a diagram of a solid freeform (SFFP) printer 100 having a discrete deposition head 102, according to an example embodiment. SFFP 100 may be configured to create three-dimensional objects, such as printed object 108. More specifically, SFFP 100 may be configured to use a material 110 to create printed object 108. There are a variety of known techniques SFFP 100 may use in order to create printed object 108 from material 110. For example, SFFP 100 may use laser sintering, fused deposition modeling, stereolithography and direct laser deposition. Material 110 may be any type of material capable of being used with SFFPs, such as plastic, metal, bio-material, edible material, etc. In an embodiment, material 110 may also be configured as feedstock, such as for example, spooled plastic or wire, or as many individual pieces of materials.

In order to create printed object 108, SFFP 100 may receive a digital representation model of printed object 108. The digital representation may be in any type of format that is suitable for describing objects in three dimensions, such as stereolithography. In stereolithography, model files (often referred to as .STL files) describe objects using virtual cubes of a fixed dimension, although other virtual shapes, such as spheres, polygonal models, polyhedrons, or irregular shapes may also be used. For example, in the case of printed object 108, the model may be broken down into many cubes of a fixed size, similar to pixels in an image. Thus, the accuracy of the digital model relates to the characteristics of the shape being modeled and the size of the virtual cubes. For example, if the shape being modeled is cubical, larger sizes of the virtual cubes may be acceptable. However, if the shape being modeled is spherical, smaller sizes may be needed to more accurately represent the shape in a digital model. SFFP 100 upon receiving the digital model of printed object 108, may use the virtual cubes to create a solid representation of printed object 108.

To form printed object 108, SFFP 100 dispenses material 110 onto a bed 104 through deposition head 102 according to the digital model of printed object 108. Although reference is made to printed object 108, it is understood that this also refers to the first deposition of material 110 before printed object 108, or a portion thereof exists. In an embodiment, deposition head 102 may be configured to move on the X, Y, or Z axes, where X is left/right movement, Y is backward/forward movement, and Z is up/down movement. This movement allows deposition head 102 to place portions of material 110 in precise positions on bed 104 or printed object 108. Bed 104 may also be configured to move on the X, Y, Z axes, according to an embodiment. Deposition head 102 and bed 104 may also be configured to both move at the same time. For example, deposition head 102 may be configured to move only on the Z axis while bed 104 is configured to move in the X and Y axes, however, other combinations of movement may also be possible. Accordingly, to form printed object 108, deposition head 102 and/or bed 104 are moved into various positions, and one or more deposition pieces are dispensed onto bed 104 and/or printed object 108. The positions where deposition head 102 may be located to dispense deposition piece 106 are determined by the model of printed object 108.

In an embodiment, deposition head 102 may be configured to dispense deposition piece 106 by releasing deposition piece above printed object 108 and/or bed 104, and letting drop onto printed object 108. Deposition head 102 may also be configured to place deposition piece 106 on printed object 108 and/or bed 104 and then releasing deposition piece 106.

Deposition head 102 may be configured to dispense deposition piece 106 in solid form, which may avoid nozzle clogging, according to an embodiment. For example, deposition piece 106 may be completely solid until just before it is placed/dropped on printed object 108. Specifically, deposition head 106 may include a heat source that heats deposition piece 106 to have a molten surface on one or more sides, but still has a solid core, while deposition piece 106 is being placed/dropped on printed object 108. In an embodiment, the heat source may also heat deposition piece 106 so that deposition piece 106 is completely molten while it is being placed/dropped on printed object 108. The heat source may be a fiber laser, infrared heat source, or any other heat source capable of heating the deposition piece 106 such that it can have a molten surface and/or be completely molten.

In an embodiment, deposition head 102 may also form deposition piece 106 in a manner that most suitably resembles the volume represented by the digital model of printed object 108. For example, deposition head 102 may dispense materials in cubes when cubes may most represent the object being printed. Although, deposition head 102 may be also configured to form deposition piece 106 into other shapes too, such as spheres, polyhedrons, etc.

SFFP 100 may also be configured to heat the surface of printed object 108 prior to dispensing deposition piece 106, which may reduce layering effects in printed object 108 and provide better adhesion between disposition piece 106 and printed object 108. In an embodiment, printed object 108 may be heated by a heat source, such as a fiber laser, infrared heat source, or any other heat source capable of heating the surface of printed object 108 for adhesion with deposition piece 106. In an embodiment, this heat source may be the same heat source that heats deposition piece 106 or it may be a separate heat source.

As explained above, SFFP 100 may dispense deposition piece 106 in solid form, and deposition piece 106 may be heated as it is being placed/dropped on printed object 108. Accordingly, in an embodiment, SFFP 100 may be configured with a plurality of deposition heads or an array of deposition heads, such as deposition head 102. Each of the deposition heads may be placed next to each other, so that SFFP 100 can dispense numerous deposition pieces, such as deposition piece 106 in parallel. This may allow for much faster creation of printed object 108 because numerous deposition pieces may be dispensed at once. The limit on the number of deposition heads may be determined by the size of SFFP 100 and the parameters of how fast a print should take. For example, the final speed of the printer may be calculated by size of the footprint of deposition head 102 multiplied by the height of the model divided by the rate of deposition and piece size.

An Example Deposition Head

Figure 2:
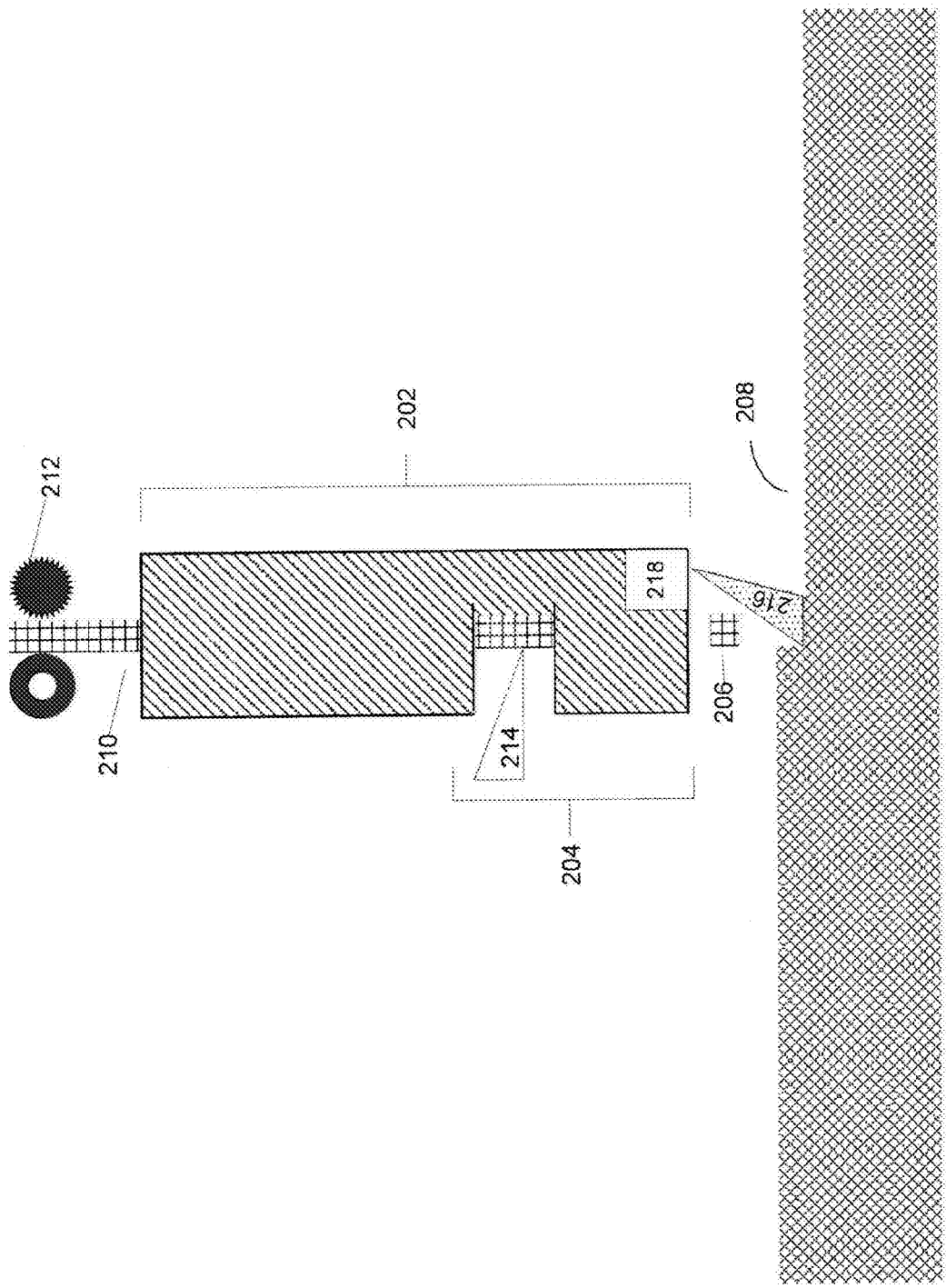
FIG. 2 illustrates an example deposition head for creating a model, according to an embodiment.

FIG. 2 illustrates an example deposition head 202 for creating a model 208, according to an embodiment. Deposition head 202 includes a deposition assembly 204 and a feeder 212. Feeder 212 may hold or dispense material 210 to the deposition assembly 204. Deposition assembly 204 may be configured to receive material 210 from the feeder 212 and deposit the material onto a model 208. The desired material may be any type of material suitable for use with an SFFP, such as metal or plastic, or a combination thereof. Model 208 may be any type of object that is capable of being created using an SFFP. The ultimate size of model 208 may depend on the size of the SFFP. For example, a larger print bed and/or a larger maximum area of movement of deposition head 202 may allow for larger models to be created.

In an embodiment, feeder 212 may be a tube or sleeve configured to feed stock of material 210 to the deposition assembly 204, according to known methods. For example feedstock of material 210 may be attached to a reel, and fed through feeder 212 using one or more motors. In an embodiment, deposition assembly 204 may include a feedstock cutter 214. Feedstock cutter 214 may be configured to cut feedstock material 210 into a deposition piece 206, which is deposited from deposition head 202. Feedstock cutter 214 may be located close to the end of deposition assembly, where deposition piece 206 is deposited from. It should be understood that although reference is made to a single deposition piece 206, deposition head 202 deposits many deposition pieces while model 208 is being created. Feeder 212 may also be configured to feed feedstock of material 210 in solid form to deposition assembly 204.

Deposition assembly 204 may be configured to receive pre-cut pieces material 210 instead of feedstock of material 210, according to an embodiment. In such a case, feeder 212 may be configured as a hopper to hold individual pieces of material 210. Deposition assembly 204 may include a mechanism for depositing individual pieces of material 210 onto model 208, instead of using feedstock cutter 214. Although, deposition assembly 204 may also be configured to receive both continuous feed material 210, and pre-cut pieces of material 210, and thus, have both feedstock cutter 214 and a mechanism for depositing individual pieces. The pre-cut pieces may be formed in a manner that closely represents the shape of model 208. For example, if model 208 is a cubical in shape, the pre-cut pieces may be cubical too.

The height of the deposition assembly 204 above the model 208 may depend on the particular application. For example, the height of deposition assembly 204 may be directly above the topmost layer already deposited in the model 208. In such as case, deposition assembly 204 may be configured to place the deposition piece 206 on model 208 and then release it. Deposition assembly 204 may also be configured to release and drop deposition piece 206 above model 208.

Deposition assembly 204 may also include a heat source 218. Heat source 218 may be any type of heating source capable of melting at least the surface of material 210, for example an infrared heat source or a fiber laser. Specifically, heat source 218 may be configured to heat deposition piece 206 before it is attached to model 208. Heat source 218 may be configured to heat one or more surfaces of deposition piece 206 such that only the surfaces of deposition piece 206 are molten, but the core is still solid. Heat source 218 may also be configured to heat the entirety of deposition piece 206 such that deposition piece 206 is entirely molten, according to an embodiment.

In an embodiment, heat source 218 may be configured to heat the area where deposition piece 206 is to be deposited, which may ensure better adhesion of deposition piece 206 to an object model and/or reduce layering in an object model, and increase shear strength. For example, in the cases where heat source 218 is a laser, lines 216 show an example of the beam envelope created by heat source 218. As shown, the beam of heat source 218 may be wide enough to heat both deposition piece 206 as it is placed on model 208 and the area on model 208 where deposition piece 206 is to be deposited. Heat source 218 may be controlled by any mechanism well known in the art for controlling the energy of heat source 218. For example, in the case where heat source 218 is a laser, modulation may be used. Although FIG. 1 is shown with a single heat source 218, according to an embodiment, deposition head 202 may also be configured with two or more heat sources. For example, one heat source could be used for heating deposition piece 206 as it is placed on model 208 and a different heat source could be used for heating the area where deposition piece 206 is to be deposited.

Deposition assembly 204 may also be configured to pre-heat pieces of material 210 before they are deposited onto model 208. Specifically, deposition assembly 204 may be configured to maintain material 210 at just below its melting point. For example, deposition assembly 204 may heat material 210 to near the glass transition point for thermoplastics. This may decrease the amount of heat needed from heat source 218 to be applied to deposition piece 206. Deposition assembly 204 may maintain the pre-heat temperature by maintaining an ambient temperature inside deposition assembly 204 or feeder 212 at below the melting point of material 210 or any other desired pre-heat temperature.

In the case of feedstock, deposition assembly 204 may be configured to pre-heat at least a portion of the feedstock while it is deposition assembly 204 or feeder 212, according to an embodiment. Deposition assembly 204 may also be configure to apply the pre-heating after deposition piece 206 is cut from material 210, but before it is deposited on model 208. In the case of pre-cut pieces of material 210, deposition assembly 204 may be configure to heat material 210 while it is still the hopper, while it is travelling through deposition assembly 204, or just before it is deposited on material 210.

In some cases, depending on the material and capabilities of deposition assembly 204 it may not be possible to maintain the temperature of material 210 at just below its melting point. In such a case, according to an embodiment, deposition assembly may still heat material 210 at a heightened temperature. Accordingly, in such cases, the amount of additional heat to be applied by heat source 218 is still minimized.

An Example Feedstock Deposition Head with Rotational Cutter

Figure 3A:
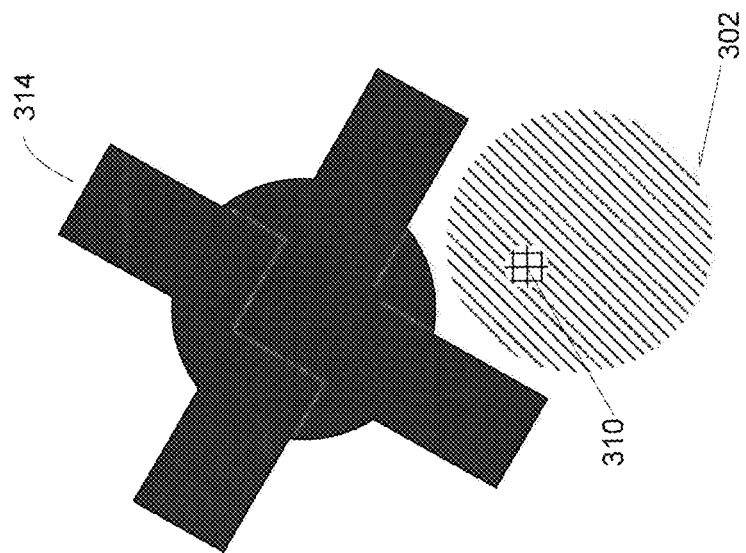
FIGS. 3A and 3B illustrates a deposition head configured for feedstock with a rotational cutter, according to an embodiment.
Figure 3B:
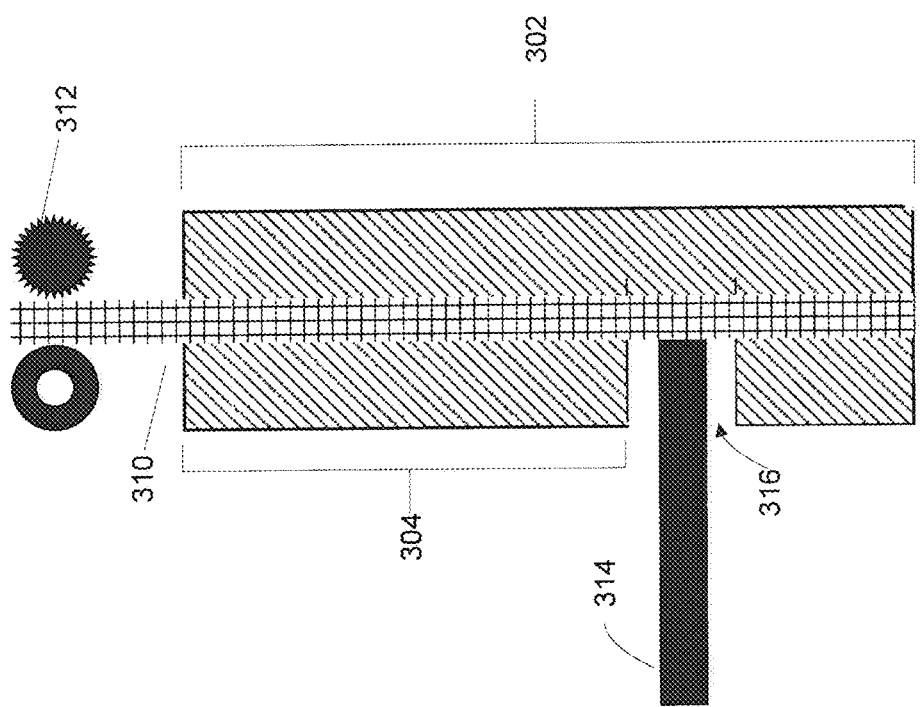

FIG. 3A illustrates a top-down profile of a deposition head 302 configured for feedstock with a rotational cutter 314, according to an embodiment. FIG. 3B illustrates the same deposition head 302 from a side view. Deposition head 302 includes the rotational cutter 314 and a feed tube 304. Inserted through feed tube 304 is feedstock 310. Feedstock 310 may be any type of material capable of being used with an SFFP, such as metal, plastic, or a combination thereof. In an embodiment, the diameter of feed tube 304 may a large enough to encompass one or more sizes of feedstock 310. Feed tube 304 is also attached to a feeder 312. Feeder 312 may be any type of known feedstock feeder capable of feeding feedstock 310 through feed tube 304, such a feeder 212 of FIG. 1. Located near the bottom of feed tube 304 may be a cutting window 308. Cutting window 308 is large enough to allow for a blade to cut feedstock 306.

Deposition head 302 may also include a rotational cutter 314. Rotational cutter 314 may be configured with two or more blades arranged around cylinder. For example, as depicted in FIG. 3A, rotational cutter 314 is configured with 4 blades arranged equally around a cylinder, although other numbers of blades and arrangements of blades could be used. Rotational cutter 314 may be located such that when rotated about its axis perpendicular to the blades, the blades slide through cutting window 308 to cut feedstock 310. In an embodiment, feeder 312 may be synchronized with rotational cutter 314 to create appropriately sized deposition pieces. For example, to create larger deposition pieces, feeder 312 may be configured to feed more feedstock per rotation or partial rotation of rotational cutter 314. Likewise, to create smaller deposition pieces, feeder 312 may be configure to feed less feedstock per rotation or partial rotation of rotational cutter 314.

An Example Feedstock Deposition Head with Lateral Cutter

Figure 4A:
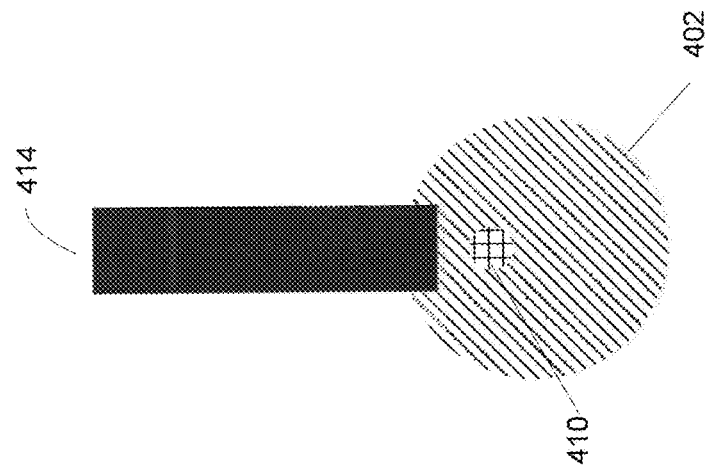
FIGS. 4A and 4B illustrates a deposition head configured for feedstock with a lateral cutter, according to an embodiment.
Figure 4B:
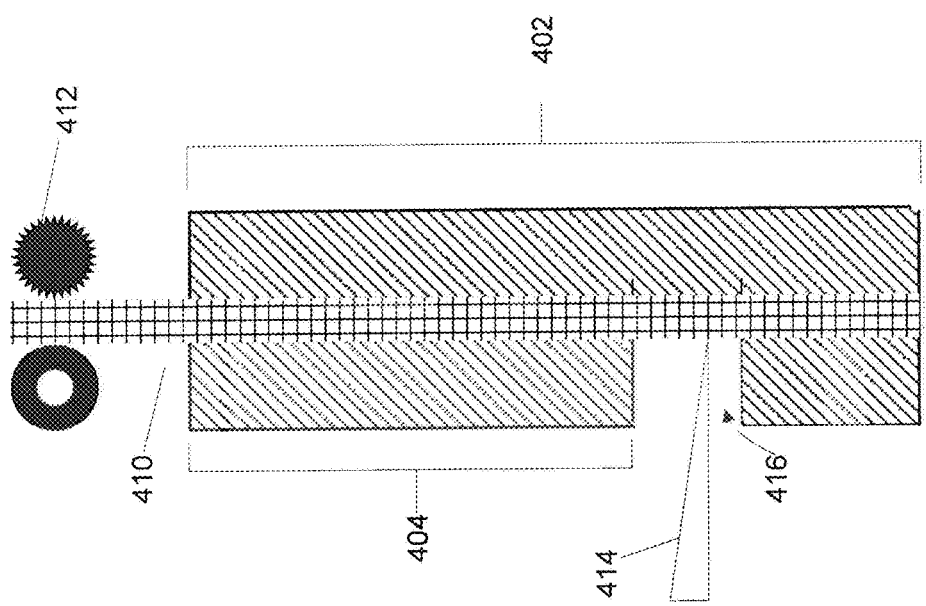

FIG. 4A illustrates a top-down profile of a deposition head 402 configured for feedstock with a lateral cutter 414, according to an embodiment. FIG. 4B illustrates the same deposition head 402 from a side view. Deposition head 402 includes the lateral cutter 414 and a feed tube 404. Inserted through feed tube 404 is feedstock 410. Feedstock 410 may be any type of material capable of being used with an SFFP, such as metal, plastic, or a combination thereof. In an embodiment, feed tube 404 may a large enough tube diameter to encompass one or more sizes of feedstock 410. Feed tube 404 is also attached to a feeder 412. Feeder 412 may be any type of known feedstock feeder capable of feeding feedstock 410 through feed tube 404, such a feeder 212 of FIG. 2. Located near the bottom of feed tube 404 may be a cutting window 416. Cutting window 416 is large enough to allow for a blade to cut feedstock 410.

Deposition head 402 may also include a lateral cutter 414. Lateral Cutter 414 may be a single blade capable of being inserted into cutting window 416 laterally. When lateral cutter 414 is inserted into cutting window 416 a deposition piece may be cut from feedstock 410. In an embodiment, lateral cutter 414 may be arranged with a sloped blade such that when lateral cutter 414 is used to cut feedstock 410, the deposition piece may be forced downwards through feed tube 404. In an embodiment, the feeder may be synchronized with lateral cutter 414 to create appropriately sized pieces of a disposition material. For example, to create larger deposition pieces, feeder 412 may be configured to feed more feedstock per lateral movement of lateral cutter 414. Likewise, to create smaller deposition pieces, feeder 412 may be configured to feed less feedstock per lateral movement of lateral cutter 414.

An Example Pre-Formed Piece Deposition Head

Figure 5:
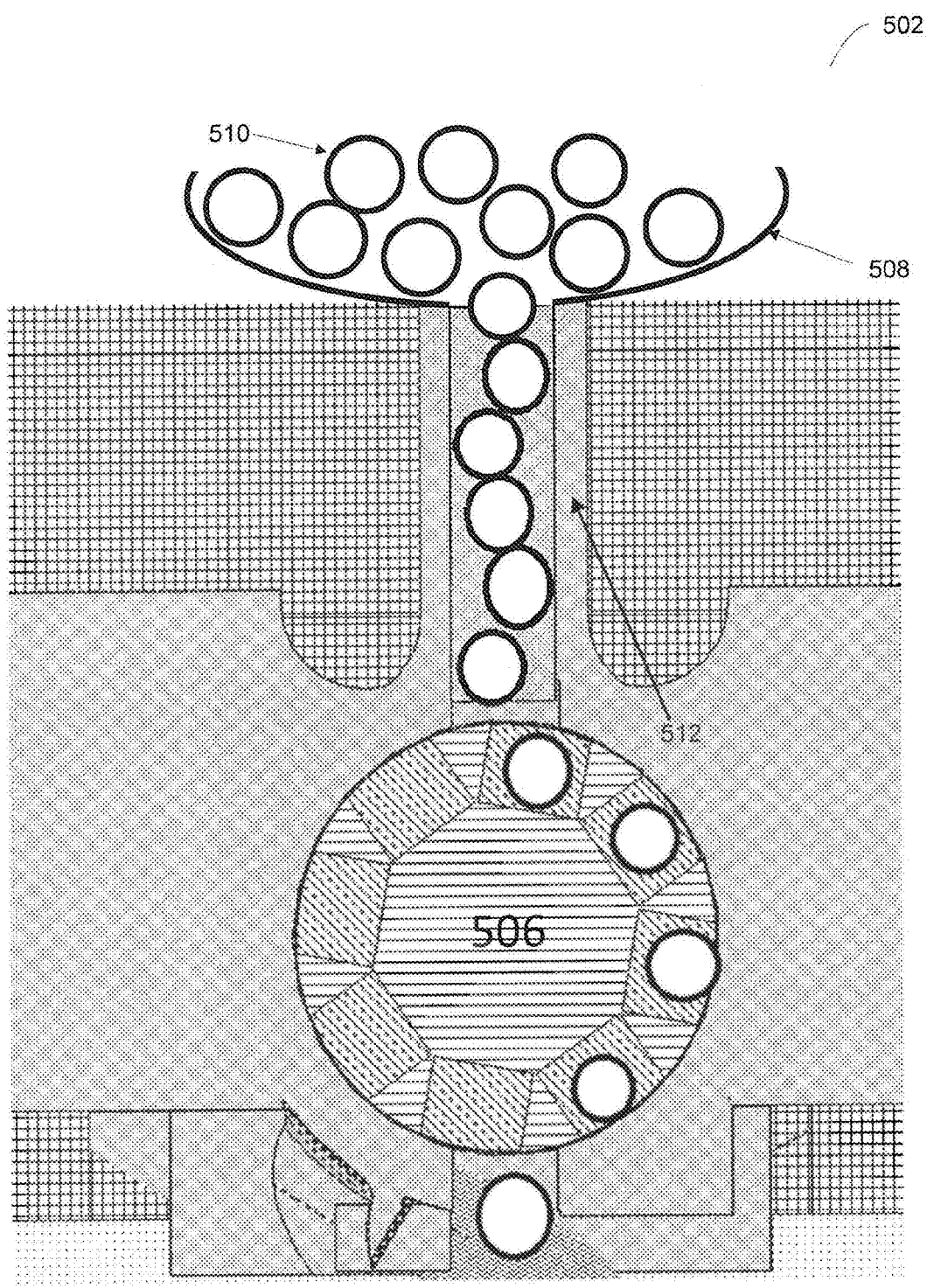
FIG. 5 illustrates a deposition head with a pre-formed piece feeder, according to an embodiment.

FIG. 5 illustrates a deposition head 502 with a pre-formed piece feeder 512, according to an embodiment. Feeder 512 includes a hopper structure 508 that holds pre-formed pieces of deposition material 510. Attached to the hopper structure 508 is a deposition device 506. Deposition device 506 may be any device capable of dispensing individual pre-formed pieces of deposition material 510, including, but not limited to, a gear, flap, etc. In an embodiment, deposition device 506 may be a gear that has spokes spaced such that a single piece of deposition material 510 can fit between each spoke. Accordingly, in such a case when deposition device 506 is a gear, as deposition device 506 is rotated, single pieces of deposition material 510 are dispensed from feeder 512.

The particular shape of deposition device 506 may depend on the particular shape of deposition material 510. For example, as shown in FIG. 5, if deposition material 510 is spherical, triangular or trapezoidal spokes may be used. However, the spokes of deposition device 506 may be any shape capable of dispensing deposition material 510, including, but not limited to, squares, rectangles, hooks, scoops, etc. According to an embodiment, the spokes may also be electronically magnetized in order to dispense metallic materials.

An Example Dual Heat Source Deposition Head

Figure 6:
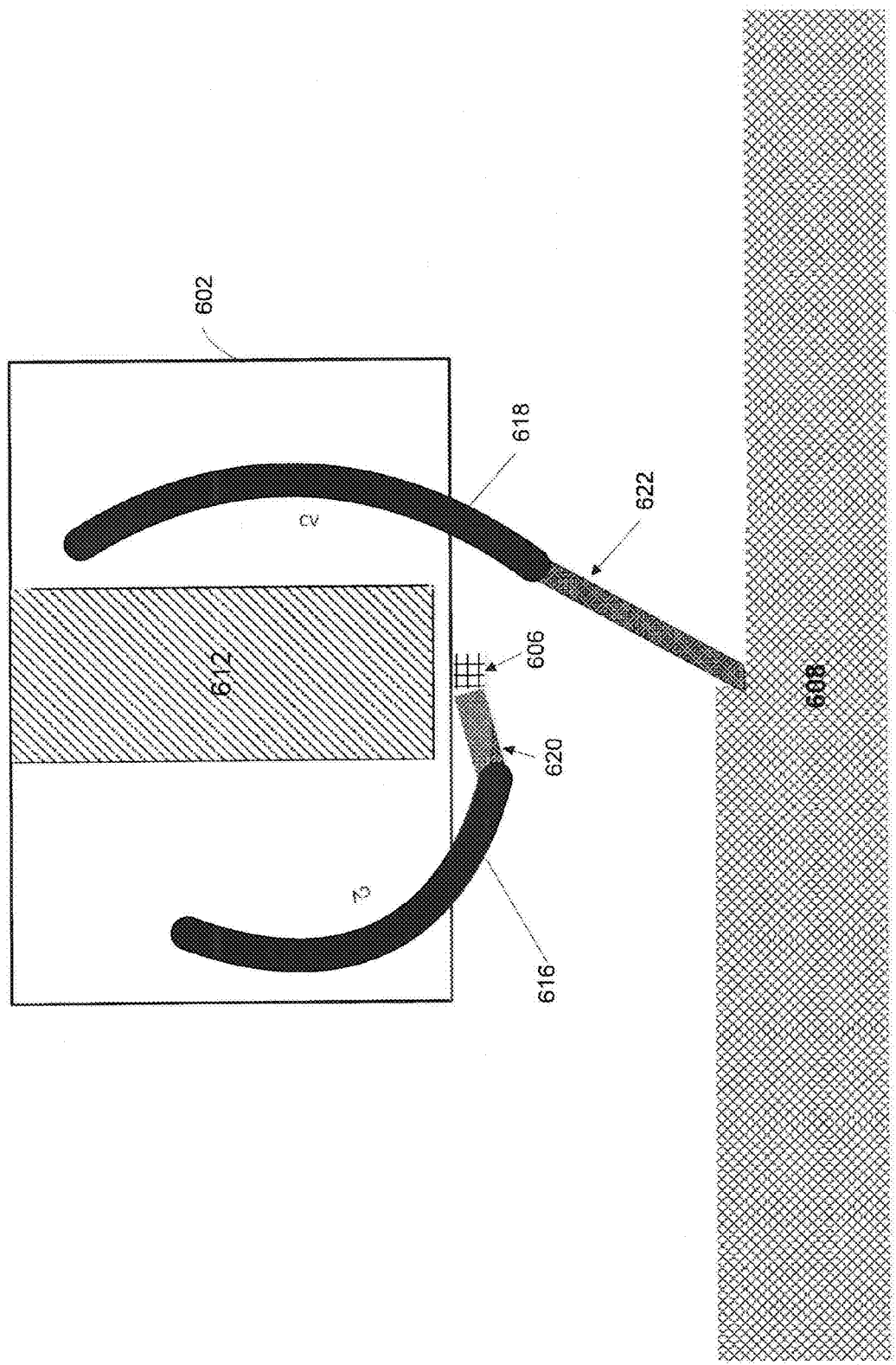
FIG. 6 illustrates an example deposition head with dual heat sources, according to an embodiment.

FIG. 6 illustrates an example deposition head 602 with dual heat sources, according to an embodiment. Deposition head 602 includes a feeder 612 capable of dispensing a solid deposition piece 606 onto a printed object 608. As explained above, although reference is made to printed object 608, it is understood that this also refers to the first deposition of deposition piece 606 before printed object 608, or a portion thereof exists. Feeder 612 may dispense deposition piece 606 from feedstock or individual pieces, or a combination thereof, in accordance with the various embodiments described in FIGS. 1-5.

Deposition head 602 also includes a material heat source 616 and a target heat source 618. Material heat source 616 and target heat source 618 are both any type of heat source capable of heating the material used by printed object 608. For example, target heat source 618 and material heat source 616 may each be a fiber laser, infrared heat source, etc. Material heat source 616 may be configured to heat deposition piece 606 after it has been dispensed from deposition head 602, according to an embodiment. This is depicted in FIG. 6 as material envelope 620. Material heat source 616 may also be configured to heat deposition piece 606 as it is being dispensed from deposition head 602. For example, deposition head 602 may place deposition piece 606 by placing it on printed object 608 and then releasing deposition piece 606. In such a case, material heat source 616 may be configured to heat deposition piece 606 as it is being released from deposition head 602.

The amount of heat that material heat source 616 applies to deposition piece 606 may depend on the particular type of material being used and the particular application. For example, material heat source 616 may heat one or more surfaces of deposition piece 606 such that only the surfaces of deposition piece 606 are molten, but the core of deposition piece 606 is still solid. Material heat source 616 may also heat deposition piece 606 until it is entirely molten. Other factors may also affect the amount of heat that material heat source 616 applies such as, ambient temperature and the amount of time it takes to place deposition piece 606 on printed object 608.

Target heat source 618 may be configured to heat the area on printed object 608 where deposition piece 606 is to be placed. This area is depicted in FIG. 6 by target envelope 622. In an embodiment, target envelope 622 is as confined to the dimensions of deposition piece 606 as possible. Although, in an embodiment, target envelope 622 may be smaller or larger than the deposition piece 606. In an embodiment, target heat source 618 may heat only the surface of the area inside of target envelope 622 to ensure adhesion with deposition piece 606. The amount of heat that target heat source 618 may need to apply may depend on a variety of factors, including, but not limited to such as the type of material used in printed object 608, ambient temperature, and time since adjacent pieces on the printed object 608 were placed.

CONCLUSION

The foregoing description has been presented for purposes of illustration and description. It is not intended to be exhaustive or to limit the precise embodiments disclosed. Other modifications and variations may be possible in light of the above teachings.

The embodiments and examples were chosen and described in order to best explain the principles of the embodiments and their practical application, and to thereby enable others skilled in the art to best utilize the various embodiments with modifications as are suited to the particular use contemplated. By applying knowledge within the skill of the art, others can readily modify and/or adapt for various applications such specific embodiments, without undue experimentation, without departing from the general concept. Therefore, such adaptations and modifications are intended to be within the meaning and range of equivalents of the disclosed embodiments, based on the teaching and guidance presented herein.

What is claimed is:

1. A discrete deposition head for a solid-free form printer comprising:
    a feeder configured to feed a target material in solid form to a deposition assembly, wherein the target material is a plurality of pre-formed pieces of the target material, wherein the feeder is configured to hold the plurality of pre-formed pieces of the target material, and wherein the deposition assembly includes a gear for dispensing each of the plurality of pre-formed pieces of the target material individually;
    the deposition assembly, wherein the deposition assembly is configured to:
    create a deposition piece from the target material; and
    dispense the deposition piece onto a portion of a printed object,
    wherein the deposition piece is in solid form within the deposition assembly; and
    a target heat source, wherein the target heat source heats the portion of the printed object in an area where the dispensed deposition piece is to be placed.

2. The discrete deposition head of claim 1, wherein the target material is at least one of a plastic or a metal.

3. The discrete deposition head of claim 1, wherein the gear includes a plurality of spokes, and wherein the plurality of spokes are spaced such that a single pre-formed piece of the target materials fits between the plurality spokes.

4. The discrete deposition head of claim 3, wherein the plurality of spokes are triangular or trapezoidal.

5. The discrete deposition head of claim 1, further comprising a material heat source, wherein the material heat source heats a portion of the deposition piece as it is being dispensed onto the portion of the printed object.

6. The discrete deposition head of claim 5, wherein the material heat source heats one or more surfaces of the deposition piece while a core of the deposition piece remains solid.

7. The discrete deposition head of claim 5, wherein the material heat source heats the deposition piece such that the deposition piece is completely melted.

8. The discrete deposition head of claim 3, wherein the target material is metallic, and the plurality of spokes are electronically magnetized to dispense the target material.

9. The discrete deposition head of claim 1, wherein the portion of the printed object heated by the target heat source is smaller than a size of a pre-formed piece of the target material.

10. The discrete deposition head of claim 1, wherein the deposition assembly pre-heats the target material below its melting point within the discrete deposition head.

11. A solid freeform printer for printing a three-dimensional object, comprising:
    a bed for holding the three-dimensional object as it is being printed in a target material; and
    the discrete deposition head of claim 1, wherein a pre-formed piece of the target material is dispensed from the deposition head in solid form onto the three-dimensional object.

12. The solid freeform printer of claim 11, wherein the target material is at least one of a plastic or a metal.

13. The solid freeform printer of claim 11, wherein the gear of the deposition head includes a plurality of spokes, and wherein the plurality of spokes are spaced such that a single pre-formed piece of the target materials fits between the plurality spokes.

14. The solid freeform printer of claim 13, wherein the plurality of spokes are triangular or trapezoidal.

15. The solid freeform printer of claim 11, further comprising an array of the deposition heads of claim 1, wherein the array dispenses one or more deposition pieces in parallel.

16. The solid freeform printer of claim 11, further comprising a material heat source attached to or included within the deposition head, wherein the material heat source heats a portion of the deposition piece as is being dispensed onto the portion of the printed object.

17. The solid freeform printer of claim 16, wherein the material heat source heats a surface of the deposition piece while a core of the deposition piece remains solid.

18. The solid freeform printer of claim 11, wherein the deposition head pre-heats the target material to below its melting point within the discrete deposition head.

* * * * *